(12) United States Patent
Yu et al.

(10) Patent No.: US 10,884,667 B2
(45) Date of Patent: Jan. 5, 2021

(54) STORAGE CONTROLLER AND IO REQUEST PROCESSING METHOD

(71) Applicant: Huawei Technologies Co., Ltd., Shenzhen (CN)

(72) Inventors: Si Yu, Hangzhou (CN); Junhui Gong, Hangzhou (CN); Cong Zhao, Hangzhou (CN); Cheng Wang, Hangzhou (CN); Yue Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/503,817

(22) Filed: Jul. 5, 2019

(65) Prior Publication Data

US 2019/0332328 A1    Oct. 31, 2019

Related U.S. Application Data

(63) Continuation of application No. PCT/CN2017/108194, filed on Oct. 28, 2017.

(30) Foreign Application Priority Data

Jan. 5, 2017  (CN) .......................... 2017 1 0008824

(51) Int. Cl.
*G06F 3/06* (2006.01)
*G06F 9/50* (2006.01)

(52) U.S. Cl.
CPC ............ *G06F 3/0659* (2013.01); *G06F 3/067* (2013.01); *G06F 3/0613* (2013.01);
(Continued)

(58) Field of Classification Search
CPC ...... G06F 3/0613; G06F 3/0659; G06F 3/067; G06F 9/5083; G06F 2209/5022; G06F 2209/503

See application file for complete search history.

(56) References Cited

U.S. PATENT DOCUMENTS 7,823,154 B2   10/2010   Wang et al.
7,917,903 B2    3/2011   Lumb et al.
(Continued)

FOREIGN PATENT DOCUMENTS

CN    101272334 A    9/2008
CN    101299181 A    11/2008
(Continued)

OTHER PUBLICATIONS

Machine Translation and Abstract of Chinese Publication No. CN103412790, Nov. 27, 2013, 7 pages.
(Continued)

*Primary Examiner* — Eric T Oberly
(74) *Attorney, Agent, or Firm* — Conley Rose, P.C.

(57) ABSTRACT

This application relates to the field of storage technologies, and discloses a storage controller. The storage controller includes a distribution core, a plurality of ranking cores, and a request processing core. The three types of cores are respectively configured to: distribute IO requests to different ranking cores, generate a processing ranking index for each IO request, and process the IO request based on a value of the processing ranking index of the IO request, to flexibly schedule an IO request received by the storage controller.

20 Claims, 11 Drawing Sheets

(52) U.S. Cl.
CPC ...... *G06F 9/5083* (2013.01); *G06F 2209/503* (2013.01); *G06F 2209/5022* (2013.01)

(56) References Cited

U.S. PATENT DOCUMENTS

| | | | |
|---|---|---|---|
| 9,170,943 | B2 | 10/2015 | Camp et al. |
| 9,680,931 | B1* | 6/2017 | Karnowski ......... H04L 67/1097 |
| 2005/0289312 | A1* | 12/2005 | Ghosal .................. G06F 3/0632 711/167 |
| 2006/0140201 | A1 | 6/2006 | Kumar et al. |
| 2010/0030931 | A1 | 2/2010 | Balasubramanian |
| 2010/0262730 | A1* | 10/2010 | Jibbe ..................... G06F 3/0613 710/40 |
| 2013/0067187 | A1 | 3/2013 | Moss et al. |
| 2013/0290656 | A1 | 10/2013 | Staelin et al. |
| 2014/0059553 | A1 | 2/2014 | Chandhoke |
| 2015/0067271 | A1 | 3/2015 | Camp et al. |
| 2015/0254088 | A1 | 9/2015 | Chou et al. |
| 2016/0092108 | A1* | 3/2016 | Karaje .................. G06F 9/5027 718/103 |
| 2016/0299695 | A1 | 10/2016 | Chen et al. |
| 2016/0299697 | A1* | 10/2016 | Chen ..................... G06F 3/0685 |
| 2016/0313943 | A1 | 10/2016 | Hashimoto et al. |
| 2017/0185449 | A1 | 6/2017 | Zhang et al. |
| 2017/0286283 | A1 | 10/2017 | Xu et al. |
| 2018/0095789 | A1 | 4/2018 | Zhang |
| 2019/0303008 | A1* | 10/2019 | Bennett ................ G06F 3/0689 |

FOREIGN PATENT DOCUMENTS

| | | | |
|---|---|---|---|
| CN | 102073461 | A | 5/2011 |
| CN | 102929787 | A | 2/2013 |
| CN | 103299271 | A | 9/2013 |
| CN | 103338252 | A | 10/2013 |
| CN | 103412790 | A | 11/2013 |
| CN | 103577115 | A | 2/2014 |
| CN | 104679575 | A | 6/2015 |
| CN | 105183375 | A | 12/2015 |
| CN | 105589829 | A | 5/2016 |
| CN | 105892955 | A | 8/2016 |
| CN | 105934793 | A | 9/2016 |
| CN | 106155764 | A | 11/2016 |
| CN | 106775493 | A | 5/2017 |
| EP | 2330506 | A1 | 6/2011 |
| JP | 2007257180 | A | 10/2007 |
| JP | 2014507025 | A | 3/2014 |

OTHER PUBLICATIONS

Foreign Communication From a Counterpart Application, European Application No. 17889889.6, Extended European Search Report dated Oct. 29, 2019, 9 pages.
Foreign Communication From a Counterpart Application, European Application No. 16925559.3, Extended European Search Report dated Nov. 18, 2019, 9 pages.
Machine Translation and Abstract of Chinese Publication No. CN101272334, Sep. 24, 2008, 16 pages.
Machine Translation and Abstract of Chinese Publication No. CN101299181, Nov. 5, 2008, 19 pages.
Machine Translation and Abstract of Chinese Publication No. CN102073461, May 25, 2011, 22 pages.
Machine Translation and Abstract of Chinese Publication No. CN103338252, Oct. 2, 2013, 9 pages.
Machine Translation and Abstract of Chinese Publication No. CN105892955, Aug. 24, 2016, 21 pages.
Machine Translation and Abstract of Chinese Publication No. CN106775493, May 31, 2017, 30 pages.
Foreign Communication From a Counterpart Application, Chinese Application No. 201710008824.7, Chinese Office Action dated Sep. 3, 2018, 5 pages.
Foreign Communication From a Counterpart Application, PCT Application No. PCT/CN2016/113083, English Translation of International Search Report dated Sep. 6, 2017, 2 pages.
Foreign Communication From a Counterpart Application, PCT Application No. PCT/CN2016/113083, English Translation of Written Opinion dated Sep. 6, 2017, 4 pages.
Foreign Communication From a Counterpart Application, PCT Application No. PCT/CN2017/108194, English Translation of International Search Report dated Jan. 31, 2018, 2 pages.
Foreign Communication From a Counterpart Application, PCT Application No. PCT/CN2017/108194, English Translation of Written Opinion dated Jan. 31, 2018, 5 pages.
Machine Translation and Abstract of Chinese Publication No. CN103577115, Feb. 12, 2014, 24 pages.
Machine Translation and Abstract of Chinese Publication No. CN104679575, Jun. 3, 2015, 16 pages.
Machine Translation and Abstract of Chinese Publication No. CN105183375, Dec. 23, 2015, 21 pages.
Foreign Communication From a Counterpart Application, Chinese Application No. 2016800916570, Chinese Search Report dated Dec. 3, 2019, 3 pages.
Foreign Communication From a Counterpart Application, Chinese Application No. 2016800916570, Chinese Office Action dated Dec. 12, 2019, 4 pages.

* cited by examiner

STORAGE CONTROLLER AND IO REQUEST PROCESSING METHOD

CROSS-REFERENCE TO RELATED APPLICATIONS

This application is a continuation of International Application No. PCT/CN2017/108194, filed on Oct. 28, 2017, which claims priority to Chinese Patent Application No. 201710008824.7, filed on Jan. 5, 2017. The disclosures of the aforementioned applications are hereby incorporated by reference in their entireties.

TECHNICAL FIELD

This application relates to the field of storage technologies, and in particular, to a storage controller and an input/output (IO) request processing method performed by the storage controller.

BACKGROUND

As shown in FIG. 1, a storage array is usually used in a large-scale storage scenario, and includes a plurality of storage mediums and a storage controller. The storage medium may include a hard disk drive (HDD) and a solid state drive (SSD). A client sends an IO request to the storage controller using a communications network. The storage controller processes the received IO request. For example, if the IO request is a read request, the storage controller determines a storage medium to which the read request points. Then, the storage controller reads corresponding data from the one or more storage mediums, and returns the data to the client.

The storage controller virtualizes the storage mediums in the storage array into a plurality of storage units. The IO request received by the storage controller usually points to a storage unit. If different storage types are used, the storage controller virtualizes the plurality of storage mediums into different types of storage units. For example, if block storage is used, the storage controller virtualizes the plurality of storage mediums into one or more logical unit numbers (LUN). Each IO request of the client points to a LUN. If file storage is used, each IO request of the client points to a file system. If object storage is used, each IO request of the client points to a bucket.

Because of service requirements, a user usually needs to set IO per second (IOPS) parameters for different storage units. If the client sends a relatively large quantity of IO requests, these IO requests point to different storage units. Because the storage controller processes an IO request at a limited speed, the storage controller needs to schedule received IO requests to fulfill QoS parameters of the plurality of storage units as much as possible.

An IOPS parameter fulfillment rate of an existing IO request scheduling method is relatively low.

SUMMARY

This application provides a storage controller, to improve an IOPS fulfillment rate.

A first aspect of this application provides a storage controller. The storage controller is applicable to a storage system having a plurality of storage units. The storage controller includes a memory device and a plurality of cores. The plurality of cores include at least one distribution core, a plurality of ranking cores, and at least one request processing core. The memory device stores a plurality of input/output IO requests, each IO request points to one storage unit, and a corresponding shared processing ranking index is further set for each storage unit in the memory device.

During operation, the distribution core executes code stored in the memory device to receive an IO request stored in the memory device, and distribute the received IO request to the plurality of ranking cores.

During operation, each ranking core executes code stored in the memory device to perform the following actions obtaining an IO request for which a processing ranking index is to be generated and that is distributed by each distribution core, determining a target storage unit to which the IO request for which a processing ranking index is to be generated points, obtaining an IO per second parameter of the target storage unit, generating, based on the IO per second parameter of the target storage unit and a value of a shared processing ranking index corresponding to the target storage unit, the processing ranking index for the IO request for which a processing ranking index is to be generated, updating, using the processing ranking index of the IO request for which a processing ranking index is to be generated, the shared processing ranking index corresponding to the target storage unit, and storing, in an index queue corresponding to the ranking core, the processing ranking index of the IO request for which a processing ranking index is to be generated, where the index queue corresponding to the ranking core is stored in the memory device and includes processing ranking indexes that are generated by the ranking core for the IO requests pointing to the plurality of storage units.

During operation, the request processing core executes code stored in the memory device to periodically process an IO request corresponding to a smallest processing ranking index in the index queue corresponding to the ranking core.

The distribution core, the plurality of ranking cores, and the request processing core may work in parallel.

The storage controller generates a processing ranking index for each IO request, and determines a processing order based on values of the processing ranking index of the IO requests, thereby effectively improving an IOPS parameter fulfillment rate.

In addition, when generating the processing ranking index for the IO request, each ranking core does not need to access another ranking core to obtain a processing ranking index generated by the another ranking core for the IO request, thereby improving processing efficiency.

Each ranking core described according to any aspect of this application or any implementation of any aspect is any one of the plurality of ranking cores.

The target storage unit described according to any aspect of this application or any implementation of any aspect is a logical unit number LUN, a file system, or a bucket.

With reference to the first aspect, in a first implementation of the first aspect, the ranking core generates the processing ranking index for the IO request for which a processing ranking index is to be generated by performing the following operation calculating, based on a sum of the value of the shared processing ranking index corresponding to the target storage unit and a ratio of K to the IO per second parameter of the target storage unit, the processing ranking index of the IO request for which a processing ranking index is to be generated, where K is a positive number.

With reference to the first implementation of the first aspect, in a second implementation of the first aspect, before calculating the processing ranking index of the IO request for which a processing ranking index is to be generated, the ranking core is further configured to obtain a current system time.

Therefore, the ranking core calculates the processing ranking index of the IO request for which a processing ranking index is to be generated by performing the following operation using, as the processing ranking index of the IO request for which a processing ranking index is to be generated, a larger one of the current system time and the sum of the value of the shared processing ranking index corresponding to the target storage unit and the ratio of K to the IO per second parameter of the target storage unit.

The system time is considered during the calculation of the processing ranking index, thereby improving IO request scheduling accuracy.

With reference to the first implementation or the second implementation of the first aspect, in a third implementation of the first aspect, the ranking core is further configured to, at a moment after which the processing ranking index is generated for the IO request for which a processing ranking index is to be generated, determine that there is no IO request that has been distributed to the ranking core, that points to the target storage unit, and for which no index has been generated.

Subsequently, the ranking core calculates a sum, at the moment, of the value of the shared processing ranking index corresponding to the target storage unit and the ratio of K to the IO per second parameter of the target storage unit, to use the sum as a pending processing ranking index. In addition, the ranking core stores the pending processing ranking index in the index queue corresponding to the ranking core. During operation of the ranking cores, once it is determined that there is no IO request pointing to the target storage unit in the IO requests that have been distributed to the ranking cores and for which no index has been generated, the pending processing ranking index is generated.

With reference to the third implementation of the first aspect, in a fourth implementation of the first aspect, within duration in which the pending processing ranking index exists in the index queue corresponding to the ranking core, an IO request corresponding to a processing ranking index that is greater than the pending processing ranking index and that is included in the index queue corresponding to the ranking core cannot be processed by the request processing core.

The ranking core is further configured to remove the pending processing ranking index from the index queue corresponding to the ranking core if an IO request pointing to the target storage unit is distributed to the ranking core after the moment or the duration in which the pending processing ranking index exists in the index queue corresponding to the ranking core exceeds a preset threshold.

Application of the pending processing ranking index can improve IO request scheduling accuracy.

With reference to any one of the first aspect or the implementations of the first aspect, in a sixth implementation of the first aspect, the request processing core periodically processes the IO request corresponding to the smallest processing ranking index in the index queue corresponding to the ranking core by performing the following operations periodically accessing the index queue corresponding to the ranking core, and processing an IO request, during each access, corresponding to the smallest processing ranking index in the index queue corresponding to the ranking core.

A second aspect of this application provides an IO request processing method. During operation, the storage controller according to the first aspect performs the method. The method includes receiving, by the distribution core, an IO request, and distributing the received IO request to the plurality of ranking cores, obtaining, by each ranking core, an IO request for which a processing ranking index is to be generated and that is distributed by each distribution core, determining, by the ranking core, a target storage unit to which the IO request for which a processing ranking index is to be generated points, obtaining, by the ranking core, an IO per second parameter of the target storage unit, generating, by the ranking core based on the IO per second parameter of the target storage unit and a value of a shared processing ranking index corresponding to the target storage unit, the processing ranking index for the IO request for which a processing ranking index is to be generated, updating, by the ranking core using the processing ranking index of the IO request for which a processing ranking index is to be generated, the shared processing ranking index corresponding to the target storage unit, storing, by the ranking core in an index queue corresponding to the ranking core, the processing ranking index of the IO request for which a processing ranking index is to be generated, where the index queue corresponding to the ranking core is stored in the memory device and includes processing ranking indexes that are generated by the ranking core for the IO requests pointing to the plurality of storage units, and periodically processing, by the request processing core, an IO request corresponding to a smallest processing ranking index in the index queue corresponding to the ranking core.

With reference to the second aspect, in a first implementation of the second aspect, the generating, by the ranking core based on the IO per second parameter of the target storage unit and a value of a shared processing ranking index corresponding to the target storage unit, the processing ranking index for the IO request for which a processing ranking index is to be generated includes calculating, based on a sum of the shared processing ranking index corresponding to the target storage unit and a ratio of K to the IO per second parameter of the target storage unit, the processing ranking index of the IO request for which a processing ranking index is to be generated, where K is a positive number.

With reference to the first implementation of the second aspect, in a second implementation of the second aspect, before the calculating, by the ranking core, the processing ranking index of the IO request for which a processing ranking index is to be generated, the method further includes obtaining, by the ranking core, a current system time, and the calculating, by the ranking core based on a sum of the shared processing ranking index corresponding to the target storage unit and a ratio of K to the IO per second parameter of the target storage unit, the processing ranking index of the IO request for which a processing ranking index is to be generated includes using, by the ranking core, as the processing ranking index of the IO request for which a processing ranking index is to be generated, a larger one of the current system time and the sum of the shared processing ranking index corresponding to the target storage unit and the ratio of K to the IO per second parameter of the target storage unit.

With reference to the first implementation or the second implementation of the second aspect, in a third implementation of the second aspect, the method further includes determining, by the ranking core, at a moment after which the processing ranking index is generated for the IO request for which a processing ranking index is to be generated, that there is no IO request that has been distributed to the ranking core, that points to the target storage unit, and for which no index has been generated, calculating, by the ranking core, a sum, at the moment, of the value of the shared processing ranking index corresponding to the target storage unit and the ratio of K to the IO per second parameter of the target storage unit, to use the sum as a pending processing ranking index, and storing, by the ranking core, the pending processing ranking index in the index queue corresponding to the ranking core.

With reference to the third implementation of the second aspect, in a fourth implementation of the second aspect, within duration in which the pending processing ranking index exists in the index queue corresponding to the ranking core, an IO request corresponding to a processing ranking index that is greater than the pending processing ranking index and that is included in the index queue corresponding to the ranking core cannot be processed by the request processing core, and the ranking core removes the pending processing ranking index from the index queue corresponding to the ranking core if an IO request pointing to the target storage unit is distributed to the ranking core after the moment or the duration in which the pending processing ranking index exists in the index queue corresponding to the ranking core exceeds a preset threshold.

With reference to any one of the second aspect or the implementations of the second aspect, in a fifth implementation of the second aspect, the periodically processing, by each request processing core, an IO request corresponding to a smallest processing ranking index in the index queue corresponding to the ranking core includes periodically accessing the index queue corresponding to the ranking core, and processing an IO request, during each access, corresponding to the smallest processing ranking index in the index queue corresponding to the ranking core.

A third aspect of this application provides a storage medium. The storage medium stores program code. When the program code is run by a storage controller, the storage controller performs the IO request processing method according to any one of the second aspect or the implementations of the second aspect. The storage medium includes but is not limited to a read-only memory, a random access memory, a flash memory, an HDD, or an SSD.

A fourth aspect of this application provides a computer program product. The computer program product includes program code. When the computer program product is executed by a storage controller, the storage controller performs the IO request processing method according to any one of the second aspect or the implementations of the second aspect. The computer program product may be a software installation package. If the IO request processing method according to any one of the second aspect or the implementations of the second aspect, the computer program product may be downloaded to the storage controller, and the computer program product runs on the storage controller.

DESCRIPTION OF EMBODIMENTS

The following describes the technical solutions in the embodiments of this application with reference to the accompanying drawings in the embodiments of this application.

Throughout this specification, a processor includes one or more central processing units, and each central processing unit includes one or more cores.

Throughout this specification, a storage unit may be a LUN, a file system, or a bucket, respectively corresponding to a case in which block storage, file storage, or object storage is used in a storage system. For example, the storage system in this specification presents P LUNs for a client, and P is a positive integer greater than 1.

Throughout this specification, an IO request includes IO data and metadata. The IO data includes information such as to-be-operated data of the IO request and an address of the to-be-operated data. The metadata includes a target storage unit ID of the IO request. The target storage unit ID may be a LUN ID, a file system ID, or a bucket ID.

Throughout this specification, a function Max $\{x, y\}$ is used to return a larger value of x and y.

Throughout this specification, an IOPS parameter may be an IOPS parameter of a storage unit, or an IOPS processing weight of a storage unit. The IOPS processing weight refers to a proportion of resources used by a storage array to process an IO request pointing to each storage unit. Therefore, the IOPS parameter may be set by a user according to a service requirement. For example, the user determines, according to a service requirement, a minimum of IOPS of a storage unit related to a service, or the user determines a weight of resources of the storage array that need to be occupied by an IO request of a storage unit related to a service. The IOPS parameter may alternatively be set according to a level of a user. For example, an advanced user has a relatively large IOPS parameter, to ensure experience of the advanced user. A storage controller stores IOPS parameters of different storage units.

Figure 1:
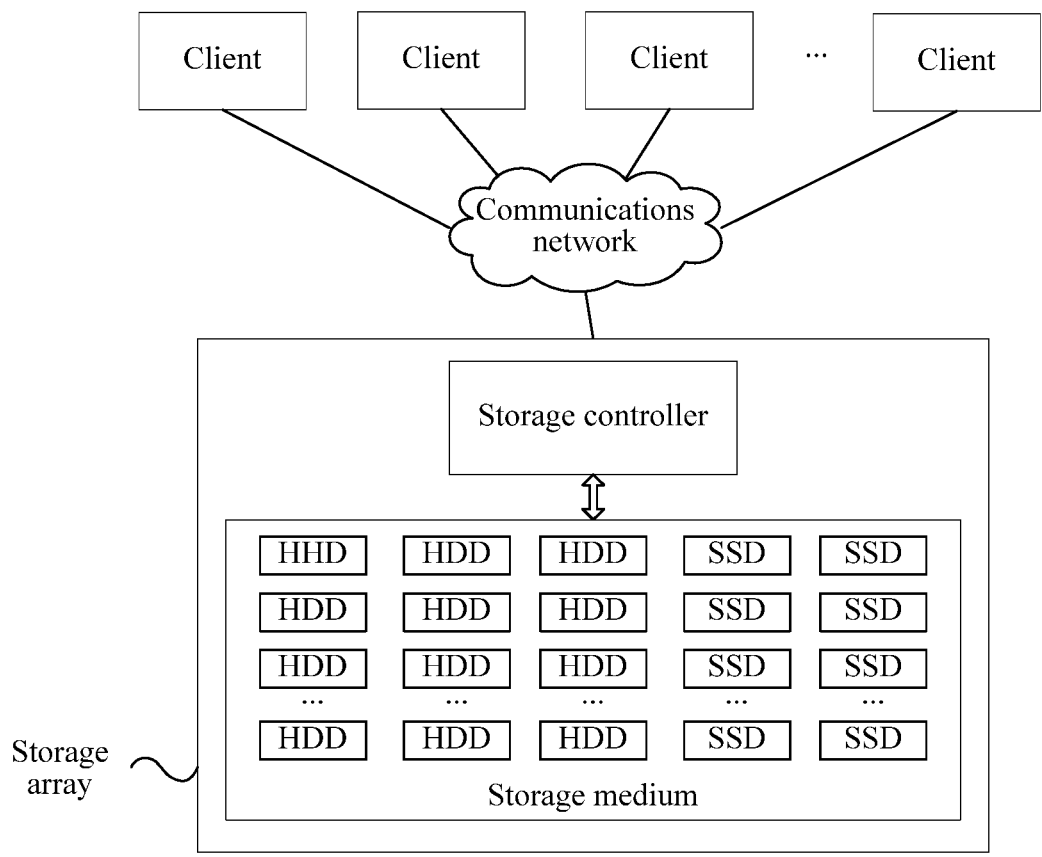
FIG. 1 is a schematic structural hierarchical diagram of a storage system according to an embodiment of this application.
Figure 2:
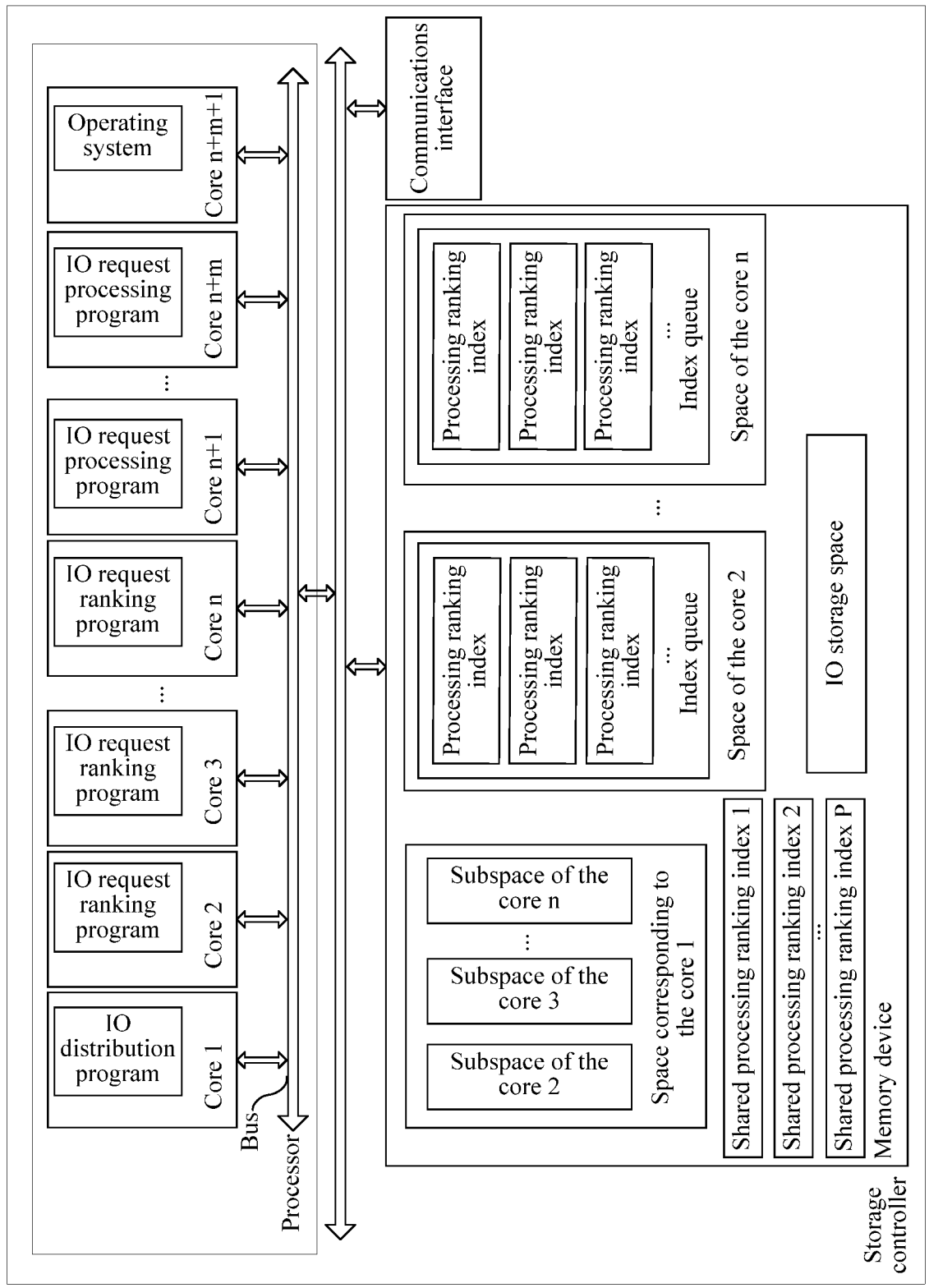
FIG. 2 is a schematic structural hierarchical diagram of a storage controller.

An architecture of a storage controller applied to this embodiment of this application As shown in FIG. 2, a processor of the storage controller includes a plurality of cores, a memory device, and a communications interface. Each core establishes a communication connection to the memory device. The storage controller communicates with a client and a storage medium using the communications interface. An IO request obtained from the communications interface is stored in an IO storage space of the memory device.

During IO request scheduling and processing, there are mainly three types of programs. An IO request distribution program, an IO request ranking program, and an IO request processing program being used. The IO request distribution program, the IO request ranking program, and the IO request processing program each are implemented by a core running code in the memory device. A core running the IO request distribution program is referred to as a distribution core, a core running the IO request ranking program is referred to as a ranking core, and a core running an IO request processing program is referred to as a request processing core.

A quantity of cores to be respectively allocated to the three types of programs may be adjusted depending on running pressure of the three types of programs. A core on which each program runs may be adjusted depending on a load status of each core. In FIG. 2, for example, a core 1 is configured to execute the IO request distribution program, a core 2 to a core n are configured to execute the IO request ranking program, a core n+1 to a core n+m are configured to execute the IO request processing program, and a core n+m+1 is configured to execute an operating system of the storage controller.

The IO request distribution program distributes IO requests in the IO storage space, and distributes the IO requests to subspaces of the cores running the IO request ranking program. In FIG. 2, for example, subspaces of the core 2 to the core n are located inside a space of the core 1. In practice, the subspaces of the core 2 to the core n may be alternatively located outside the space of the core 1, or respectively located inside spaces of the cores.

In the process in which the IO request distribution program distributes the IO requests, subsequent load balance of each IO request ranking program is mainly considered, and distribution of all IO requests pointing to a LUN to a space of a core is not considered. For example, the IO request distribution program may distribute a plurality of received IO requests to each IO request ranking program in turn, to ensure that a same quantity of IO requests are distributed to all the IO request ranking programs.

Subsequently, each IO request ranking program reads IO requests distributed to the IO request ranking program and sorts the IO requests. A sorting result is stored in an index queue in a space of a core in which each IO request ranking program is located. The index queue may be implemented using different data structures, such as a pile and a first-in-first-out queue. Each IO request ranking program generates one processing ranking index for each IO request in a subspace of the IO request ranking program, and then sorts the processing ranking indexes of the IO requests in the index queue. An IO request with small index is preferentially to be processed by an idle IO request processing program.

The IO request processing program may specifically perform, according to a type of an IO request, a write operation or a read operation corresponding to the IO request. The IO request processing program may alternatively be configured to perform configuration, deduplication, or the like on data carried by the IO request.

For example, block storage is used in a storage array in which the storage controller is located and a storage medium of the storage array is virtualized into 100 LUNs. Because of service requirements, IOPS parameters need to be set for some LUNs. Each IO request received by the storage controller points to a LUN. A client generates an IO request at an indefinite speed. Therefore, a quantity of IO requests that point to different LUNs and that are generated per second may vary greatly. Because processing efficiency of the IO request processing program is limited, the sorting result of the IO request ranking program affects whether an IOPS parameter of each LUN can be fulfilled. For example, an IOPS parameter of a LUN 1 is 1000, and an IOPS parameter of a LUN 2 is 200. However, because a relatively large quantity of IO requests pointing to the LUN 2 are generated within a period of time, 1000 IO requests pointing to the LUN 1 and 2000 IO requests pointing to the LUN 2 are stored in the IO storage space of the memory device at a moment. The 3000 IO requests are distributed to IO request ranking programs in the core 2 to the core n+1 for sorting. If the IO request ranking programs schedule the IO requests based only on the IOPS parameter of the LUN 1 and the IOPS parameter of the LUN 2, finally, it is generally difficult for the n IO request ranking programs to fulfill the IOPS parameter of the LUN 1 and the IOPS parameter of the LUN 2. If the IO request ranking programs communicate with each other during generation of processing ranking indexes, this is helpful in fulfilling a lower limit of IOPS of each LUN. However, overheads of the communication between the IO request ranking programs are very high.

This application provides an IO request processing method. The method is applicable to the storage controller shown in FIG. 2.

The memory device of the storage controller shown in FIG. 2 maintains one shared processing ranking index for each storage unit. The P shared processing ranking indexes may be read or written by each IO scheduler. Initial values of the shared processing ranking indexes are the same. For example, the initial values of the shared processing ranking indexes may be 0.

In practice, there may be a plurality of shared processing ranking index implementations. For example, the shared processing ranking indexes may be combined into a table, and set in the storage space of the memory device. All the shared processing ranking indexes are created by the operating system before the storage controller starts to distribute IO description information.

Figure 3:
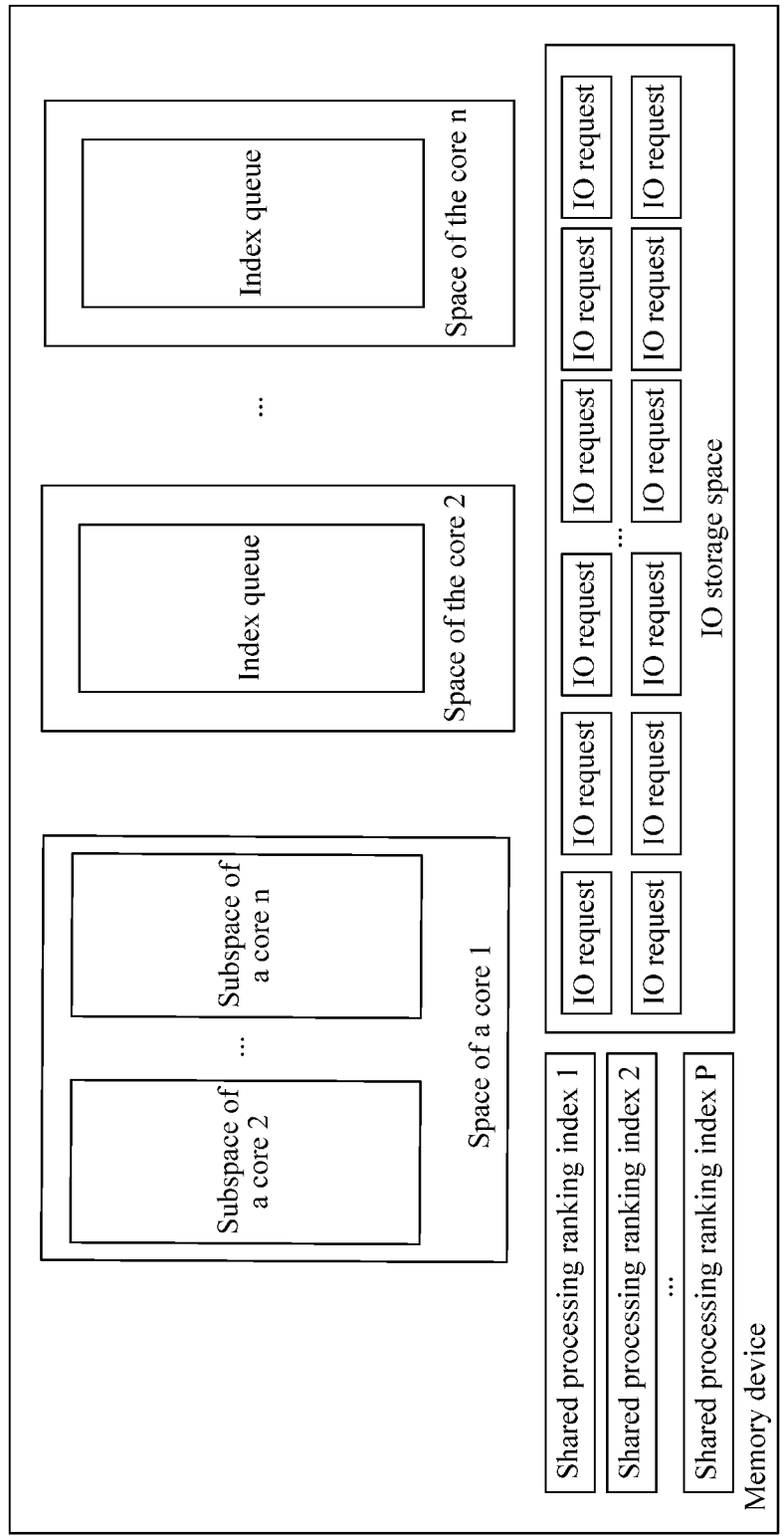
FIG. 3 is a schematic structural diagram of a memory device.

As shown in FIG. 3, the communications interface receives a plurality of IO requests sent by the client, and stores the plurality of IO requests in the IO storage space.

The IO request distribution program generates IO description information for each IO request, and establishes a mapping relationship between each IO request and the IO description information of the IO request. The IO description information of each IO request includes a LUN ID carried in metadata of the IO request.

Because the IO requests occupy a relatively large space, IO description information may be generated for each IO request during sorting of the IO requests. Subsequently, the IO request ranking program generates a processing ranking index based on the IO description information, to reduce read/write load on the memory device.

Figure 4:
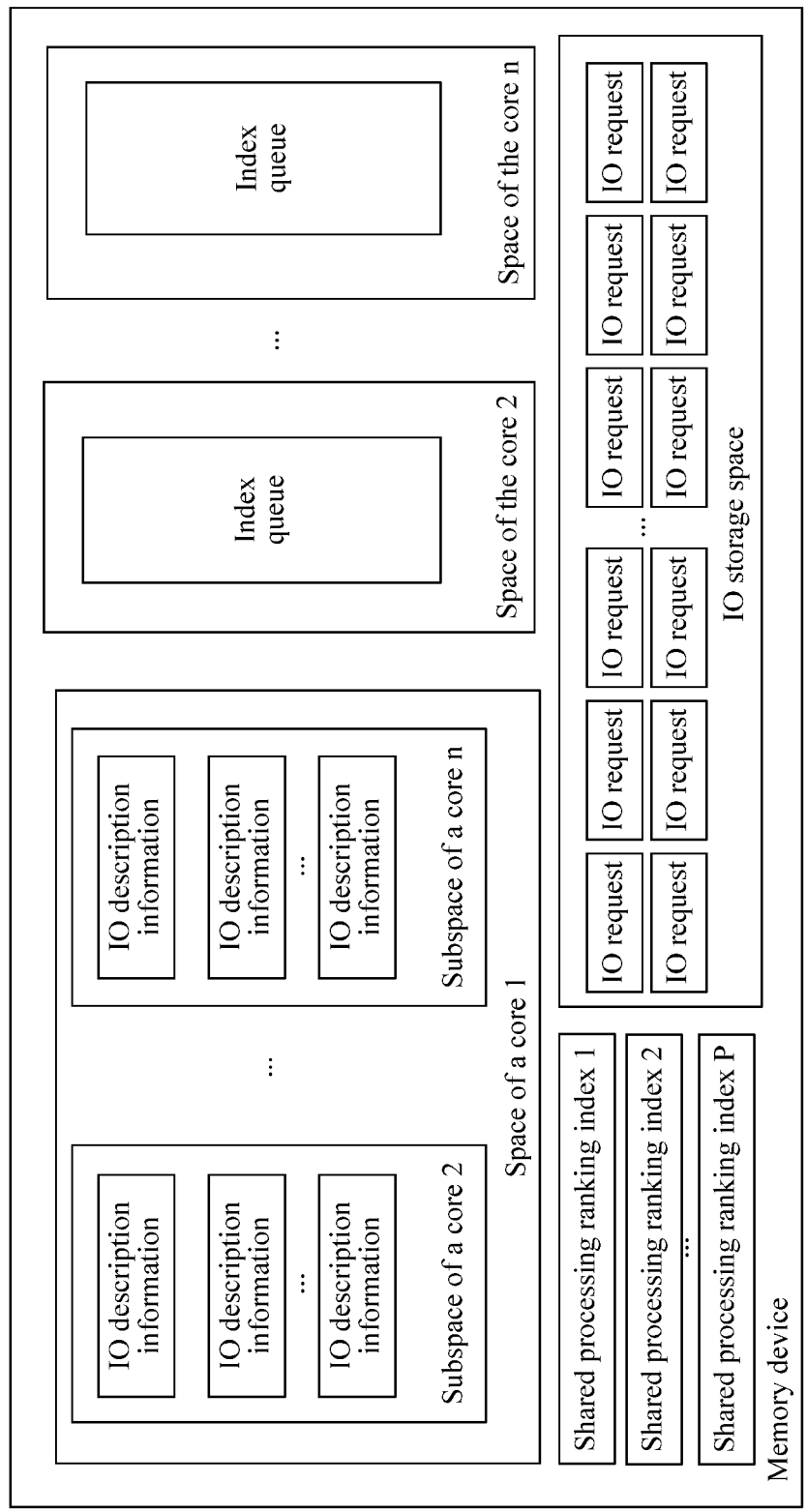
FIG. 4 is a schematic structural diagram of another memory device.

As shown in FIG. 4, the IO request distribution program distributes the plurality of pieces of IO description information to subspaces of cores in which the IO request ranking programs are located.

The IO request distribution program may create, in a subspace of a core in which each IO request ranking program is located, a queue for each LUN, and separately store, in the queue of each LUN, IO description information allocated to the subspace of the core in which the IO request ranking program is located such that in a subsequent step, the IO request ranking program identifies a LUN to which each piece of IO description information points.

How an IO request ranking program running on the core 2 generates a processing ranking index for a piece of IO description information is described below using FIG. 5. During operation, all IO request ranking programs generate a processing ranking index for each piece of IO description information using a same method.

Figure 5:
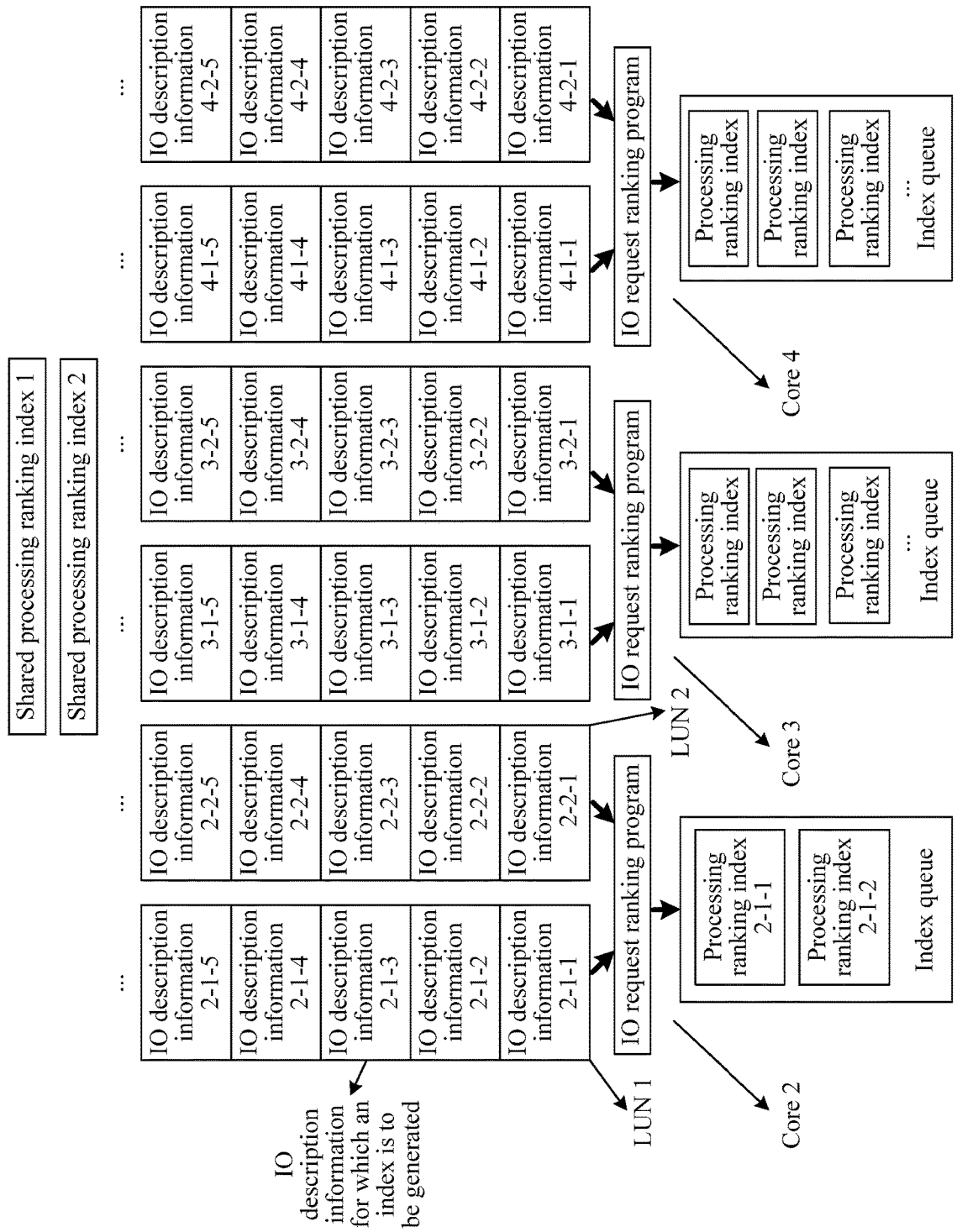
FIG. 5 is a schematic diagram of a process of generating processing ranking indexes.

In FIG. 5, IO description information A-B-C indicates $C^{th}$ IO description information that points to a LUN B and that is distributed to an IO request ranking program running on a core A. Correspondingly, a processing ranking index A-B-C indicates a processing ranking index of the IO description information A-B-C.

For example, the IO request ranking program running on the core 2 currently generates a processing ranking index for IO description information 2-1-3. Therefore, processing ranking indexes of IO description information 2-1-1 and IO description information 2-1-2 have been stored by the IO request ranking program in an index queue of the core 2.

The IO request ranking program running on the core 2 obtains the IO description information 2-1-3 from a subspace of the core 2, and obtains a LUN ID corresponding to the IO description information 2-1-3.

The IO request ranking program running on the core 2 obtains an IOPS parameter of a LUN 1 according to the LUN ID.

The IO request ranking program running on the core 2 obtains, according to the LUN ID, a value of a shared processing ranking index corresponding to the LUN 1, that is, a value of a shared processing ranking index 1.

The IO request ranking program running on the core 2 obtains a current system time using an operating system interface.

The current system time may specifically refer to a quantity of nanoseconds that have elapsed from startup of the storage controller to invocation of the operating system interface.

The IO request ranking program running on the core 2 calculates a processing ranking index 2-1-3 of the IO description information 2-1-3.

The processing ranking index 2-1-3=Max {the value of the shared processing ranking index 1+K/the IOPS parameter of the LUN 1, the current system time}. K is a positive number, and commonly, a value of K is 1.

The IO request ranking program running on the core 2 updates the shared processing ranking index corresponding to the LUN 1 using the processing ranking index 2-1-3.

After generating a processing ranking index of IO description information corresponding to a LUN, each IO request ranking program updates a shared processing ranking index corresponding to the LUN using the generated processing ranking index. Therefore, the P shared counters respectively record processing ranking indexes of IO requests that point to each LUN and that are the most recently processed. Therefore, when any IO request ranking program calculates a processing ranking index of IO description information pointing to a LUN p, a value of a shared processing ranking index p is equal to a processing ranking index of a previous piece of IO description information pointing to the LUN p. The LUN p is any one of the P LUNs presented by the storage system.

If the IO request ranking program running on the core 2 currently generates a processing ranking index for IO description information 2-1-1, the processing ranking index 2-1-1=Max {an initial processing ranking index+K/the IOPS parameter of the LUN 1, a current system time}. The initial processing ranking index may be 0.

The IO request ranking program running on the core 2 stores the processing ranking index 2-1-3 in the index queue of the core 2.

A correspondence is established between the IO description information 2-1-3 and the processing ranking index 2-1-3, or a correspondence is established between the processing ranking index 2-1-3 and an IO request for which the IO description information 2-1-3 is generated such that the IO request corresponding to the processing ranking index 2-1-3 can be determined in a subsequent step.

Using the foregoing steps, each IO request ranking program generates a processing ranking index for each piece of IO description information distributed to the IO request ranking program, and stores the processing ranking index in an index queue of the IO request ranking program. Therefore, processing ranking indexes of one or more IO requests that are not processed are stored in index queues of the core 2 to the core n.

After an IO request processing program running on any core processes an IO request, the operating system learns that the IO request processing program enters an idle state.

The operating system records a processing order of each IO request processing program, that is, the processing order indicates an IO request corresponding to a smallest processing ranking index in an index queue that is to be subsequently processed by an IO request processing program after entering an idle state. To ensure fulfillment of an IOPS parameter, the processing order needs to enable an IO request processing program to process processing ranking indexes in all the index queues at same or close frequency. An IO request processing program periodically processes an IO request corresponding to a smallest processing ranking index in each index queue.

The processing order may be each IO request processing program polls all the index queues in an order of the core 2 to the core n, and processes an IO request corresponding to a smallest processing ranking index in an index queue accessed each time. Every time after processing an IO request corresponding to a smallest processing ranking index in an index queue, an idle IO request processing program processes an IO request corresponding to a smallest processing ranking index in a next index queue.

Alternatively, if m=n−1, that is, a quantity of IO request ranking programs is the same as that of IO request processing programs, the operating system binds the IO request processing programs to the index queues respectively one by one. In this case, after an IO request processing program enters an idle state, the operating system determines that the idle IO request processing program subsequently processes an IO request corresponding to a smallest processing ranking index in an index queue corresponding to the idle IO request processing program.

After the operating system determines an index queue in which an IO request corresponding to a smallest processing ranking index is to be processed by the idle IO request processing program, the operating system selects the smallest processing ranking index from the index queue, and instructs the idle IO request processing program to process the IO request corresponding to the smallest processing ranking index, or the operating system instructs the idle IO request processing program to access the index queue, and process the IO request corresponding to the smallest processing ranking index in the index queue.

An order in which some of the foregoing steps are performed may be adjusted. Both the step of obtaining the IOPS parameter of the LUN 1 and the step of obtaining a current system time may be performed at any moment before the processing ranking index 2-1-3 is generated.

The foregoing step of obtaining a system time is an optional step. When the step is not performed, the value of the generated processing ranking index 2-1-3=the value of the shared processing ranking index 1+K/the IOPS parameter of the LUN 1.

The idle IO request processing program preferentially processes the IO request corresponding to the smallest processing ranking index in each index queue. Therefore, if no IO request pointing to a LUN is distributed within a period of time to the IO request ranking program running on the core 2, but IO requests pointing to another LUN are continuously distributed within this period of time to the IO request ranking program running on the core 2, in a subsequent period of time, once IO requests pointing to the LUN are distributed to the IO request ranking program running on the core 2, all processing ranking indexes of these IO requests pointing to the LUN may be smaller than processing ranking indexes of the IO requests pointing to the another LUN. Consequently, the IO requests pointing to the LUN are continuously preferentially processed by the idle IO request processing program, causing starvation of the IO requests pointing to the another LUN. Therefore, the consideration of the system time in the calculation of the processing ranking index prevents, if there is a long idle LUN, the IO requests pointing to the another LUN from subsequently being blocked after the IO requests pointing to the LUN are distributed to the subspace of the IO request ranking program running on the core 2, improving IO request scheduling accuracy.

For example, at a moment 1, processing ranking indexes recorded in the index queue of the core 2 include:

| | |
|---|---|
| a processing ranking index 2-1-1 = 3 | a processing ranking index 2-2-1 = 2.2 |
| a processing ranking index 2-1-2 = 3.5 | a processing ranking index 2-2-2 = 2.8 |
| a processing ranking index 2-1-3 = 5.5 | a processing ranking index 2-2-3 = 3.0 |

At a moment 2, IO requests corresponding to processing ranking indexes that have been stored in the index queue at the moment 1 have been processed. New processing ranking indexes generated between the moment 1 and the moment 2 include:

a processing ranking index 2-1-4=6
a processing ranking index 2-1-5=7.5
a processing ranking index 2-1-6=9.5
a processing ranking index 2-1-7=10.5
a processing ranking index 2-1-8=12

That is, within duration from the moment 1 to the moment 2, no new IO description information pointing to the LUN 2 is distributed to the IO request ranking program running on the core 2. Therefore, after the moment 2, if the system time is not considered in the calculation of the processing ranking index, and if new IO description information pointing to the LUN 2 is distributed to the IO request ranking program running on the core 2, processing ranking indexes of these pieces of newly distributed IO description information pointing to the LUN 2 are much smaller than a processing ranking index of IO description information pointing to the LUN 1. Consequently, when accessing the index queue of the core 2, the idle IO request processing program continuously processes newly distributed IO requests pointing to the LUN 2. However, if the system time is considered in the calculation of the processing ranking index, the processing ranking indexes of these pieces of newly distributed IO description information pointing to the LUN 2 may be equal to the current system time and not be much smaller than the processing ranking index of the IO description information pointing to the LUN 1.

Therefore, the consideration of the system time in the calculation of the processing ranking index prevents, if there is a long idle LUN within a period of time, IO requests pointing to another LUN from subsequently being blocked after IO requests pointing to the idle LUN arrive, improving IO request scheduling accuracy.

Figure 6:
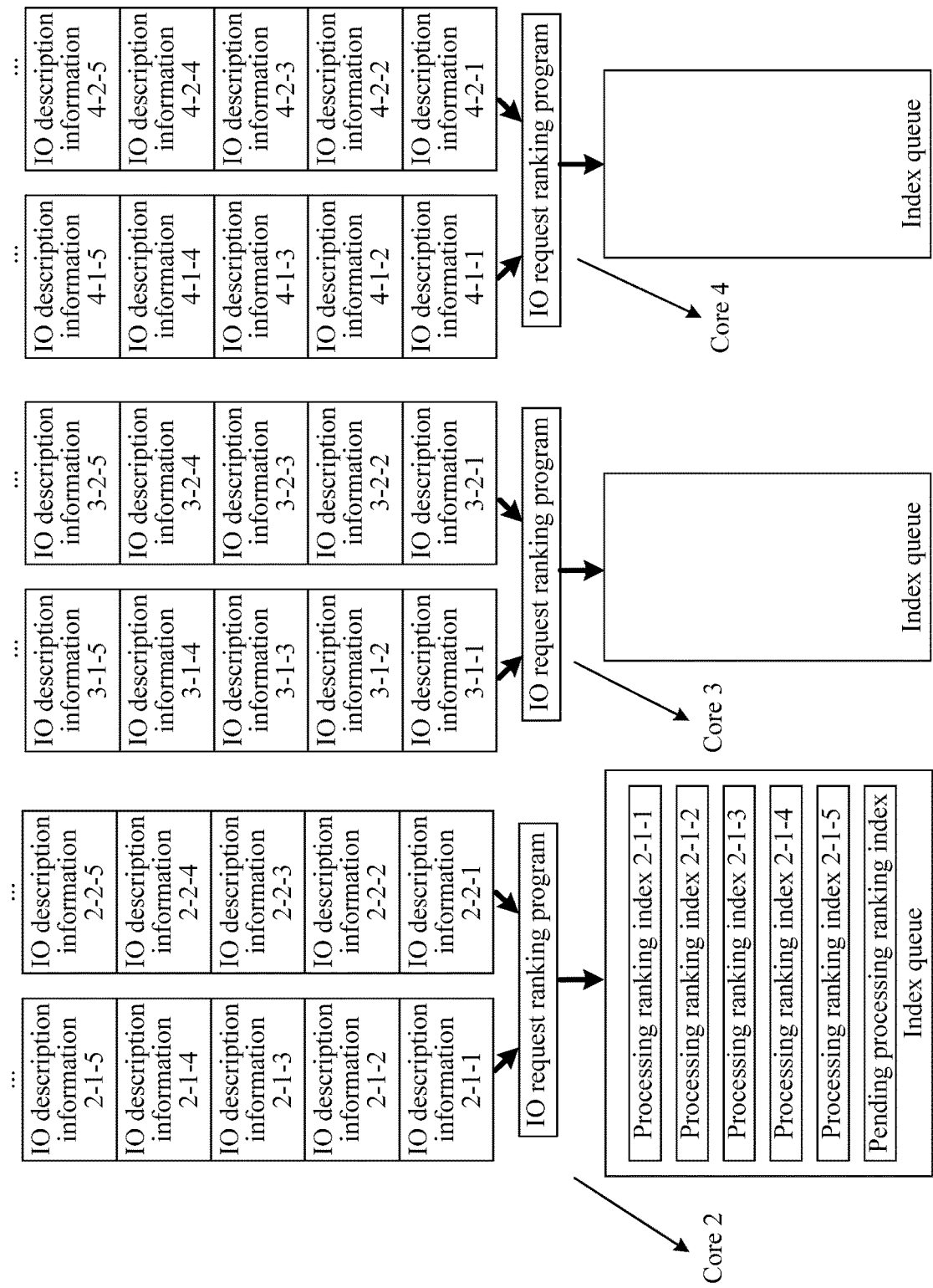
FIG. 6 is a schematic diagram of another process of generating processing ranking indexes.

In the process of performing the foregoing steps, if the IO request ranking program running on the core 2 determines, at a moment, that the IO description information pointing to the LUN 1 in the index queue of the core 2 has been processed, as shown in FIG. 6, and after the processing ranking index 2-1-5 is generated, if there is no IO description information that points to the LUN 1 and for which no processing ranking index is generated in the IO description information that is distributed to the IO request ranking program running on the core 2, the IO request ranking program running on the core 2 generates a pending processing ranking index and stores the pending processing ranking index in the index queue of the core 2.

The pending processing ranking index=the value of the shared processing ranking index corresponding to the LUN 1 at the moment+K/the IOPS parameter of the LUN 1.

The pending processing ranking index is removed in one of the following two cases. In one case, new IO description information pointing to the LUN 1 is distributed to the IO request ranking program running on the core 2. In the other case, existence duration of the pending processing ranking index exceeds a preset threshold.

The step of generating a pending processing ranking index is an optional step. Processing ranking indexes in each index queue are sorted together with the pending processing ranking index. If the operating system determines, in the process of selecting an IO request to be subsequently processed for the idle IO request processing program, that a smallest processing ranking index in a current index queue is a pending processing ranking index, because the pending processing ranking index does not correspond to any IO request, the idle IO request processing program cannot process an IO request corresponding to a processing ranking index in the index queue. The operating system may reselect an index queue for the idle IO request processing program.

For example, the idle IO request processing program polls the index queues of the cores in an order of the core 2 to the core n. If the idle IO request processing program currently polls an index queue of a core 3, but finds that a smallest processing ranking index in the index queue of the core 3 is a pending processing ranking index, the idle IO request processing program skips the index queue of the core 3, and accesses an index queue of a core 4.

Different quantities of pieces of IO description information pointing to different LUNs are distributed to the IO request ranking programs, and a speed at which an IO request ranking program generates a processing ranking index for an IO request is usually much higher than a speed at which an IO request processing program processes an IO request. Therefore, if no pending processing ranking index is generated and a small quantity of pieces of IO description information pointing to the LUN 2 is distributed to the IO request ranking program running on the core 2, IO description information corresponding to a smallest processing ranking index in the index queue of the core 2 may be caused to point to the LUN 1 all the time, causing the idle IO request processing program to constantly process the IO request pointing to the LUN 1, and finally causing it difficult to fulfill the IOPS parameter of the LUN 2.

For example, at a moment 1, processing ranking indexes stored in the index queue of the core 2 include:

| | |
|---|---|
| a processing ranking index 2-1-1 = 3 | a processing ranking index 2-2-1 = 2.2 |
| a processing ranking index 2-1-2 = 3.5 | a processing ranking index 2-2-2 = 2.8 |
| a processing ranking index 2-1-3 = 5.5 | a processing ranking index 2-2-3 = 3.0 |

At a moment 2, IO requests corresponding to some processing ranking indexes that have been generated at the moment 1 have been processed, and within duration from the moment 1 to the moment 2, new processing ranking indexes are generated. Therefore, processing ranking indexes recorded in the index queue of the core 2 include:

| | |
|---|---|
| a processing ranking index 2-1-4 = 6 | a processing ranking index 2-2-4 = 3.4 |
| a processing ranking index 2-1-5 = 7.5 | |
| a processing ranking index 2-1-6 = 9.5 | |

If in a subsequent period of time, no IO description information pointing to the LUN 2 is distributed to the IO request ranking program running on the core 2, but the IO description information pointing to the LUN 1 is constantly distributed to the IO request ranking program running on the core 2, and after an IO request corresponding to the processing ranking index 2-2-4 is processed, if no pending processing ranking index is generated, once accessing the index queue of the core 2, the idle IO request processing program constantly processes the IO request pointing to the LUN 1. Consequently, the IOPS parameter of the LUN 2 cannot be fulfilled. In contrast, a pending processing ranking index 2-2-6 is generated, and before the pending processing ranking index 2-2-6 is removed, a processing ranking index in the index queue of the core 2 that is greater than the pending processing ranking index 2-2-6 cannot be processed by the idle IO request processing program. Consequently, the idle IO request processing program needs to access another index queue. Therefore, use of the pending processing ranking index can improve IO request scheduling accuracy, thereby improving an IOPS parameter fulfillment rate.

Figure 7A:
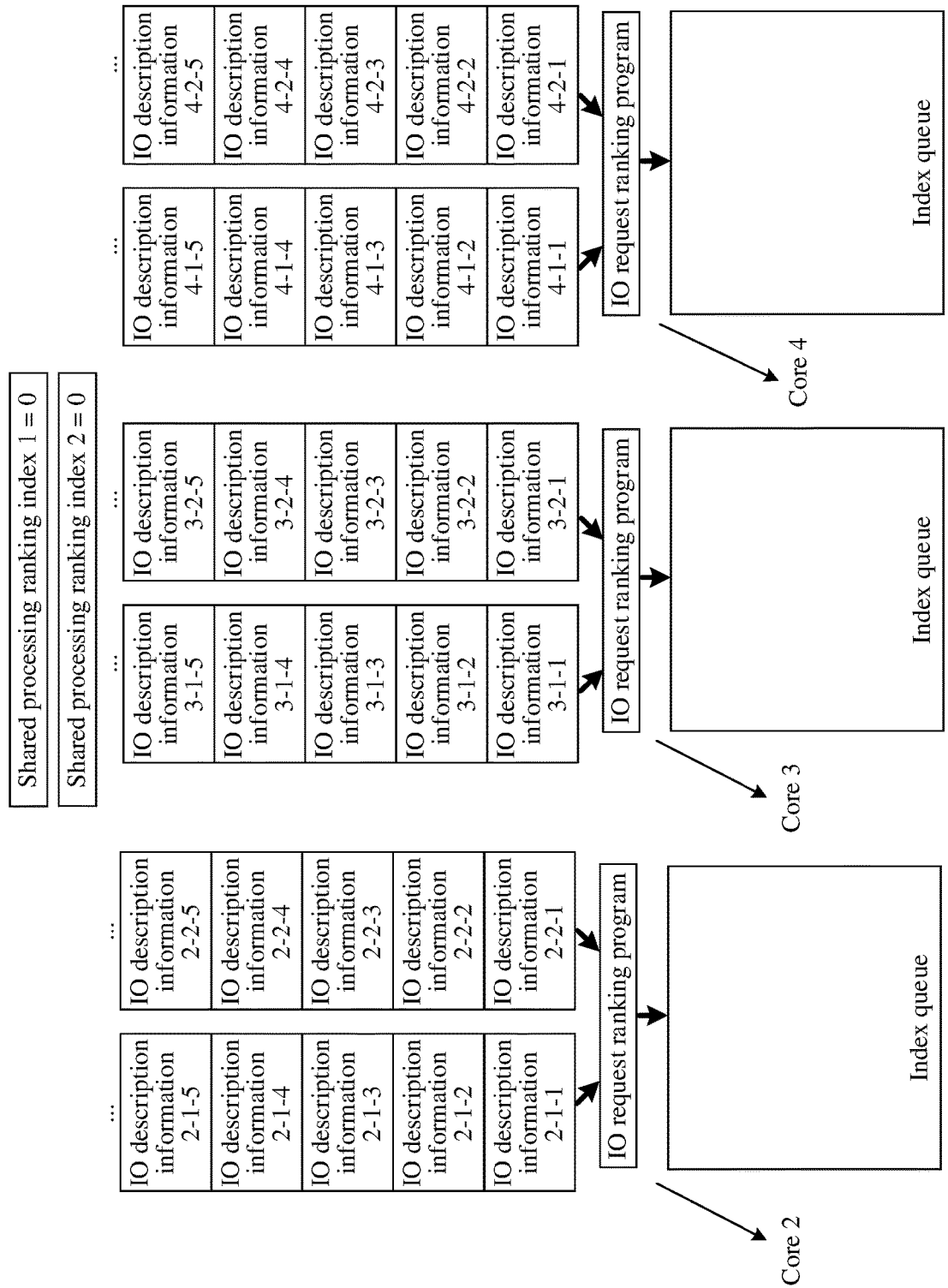
FIGS. 7A-E are schematic diagrams of another process of generating processing ranking indexes.

For example, the processor includes three ranking cores, FIG. 7A is an initial state, and initial values of the shared processing ranking index 1 and the shared processing ranking index 2 are both 0. In FIG. 7A, IO description information a-b-c indicates $c^{th}$ IO description information that points to a LUN b and that is distributed to a core a. Initial processing ranking indexes of IO description information pointing to a LUN 1 and IO description information pointing to a LUN 2 are both 0. An IOPS parameter of the LUN 1 is 1000, an IOPS parameter of the LUN 2 is 500, and K=1.

Figure 7B:
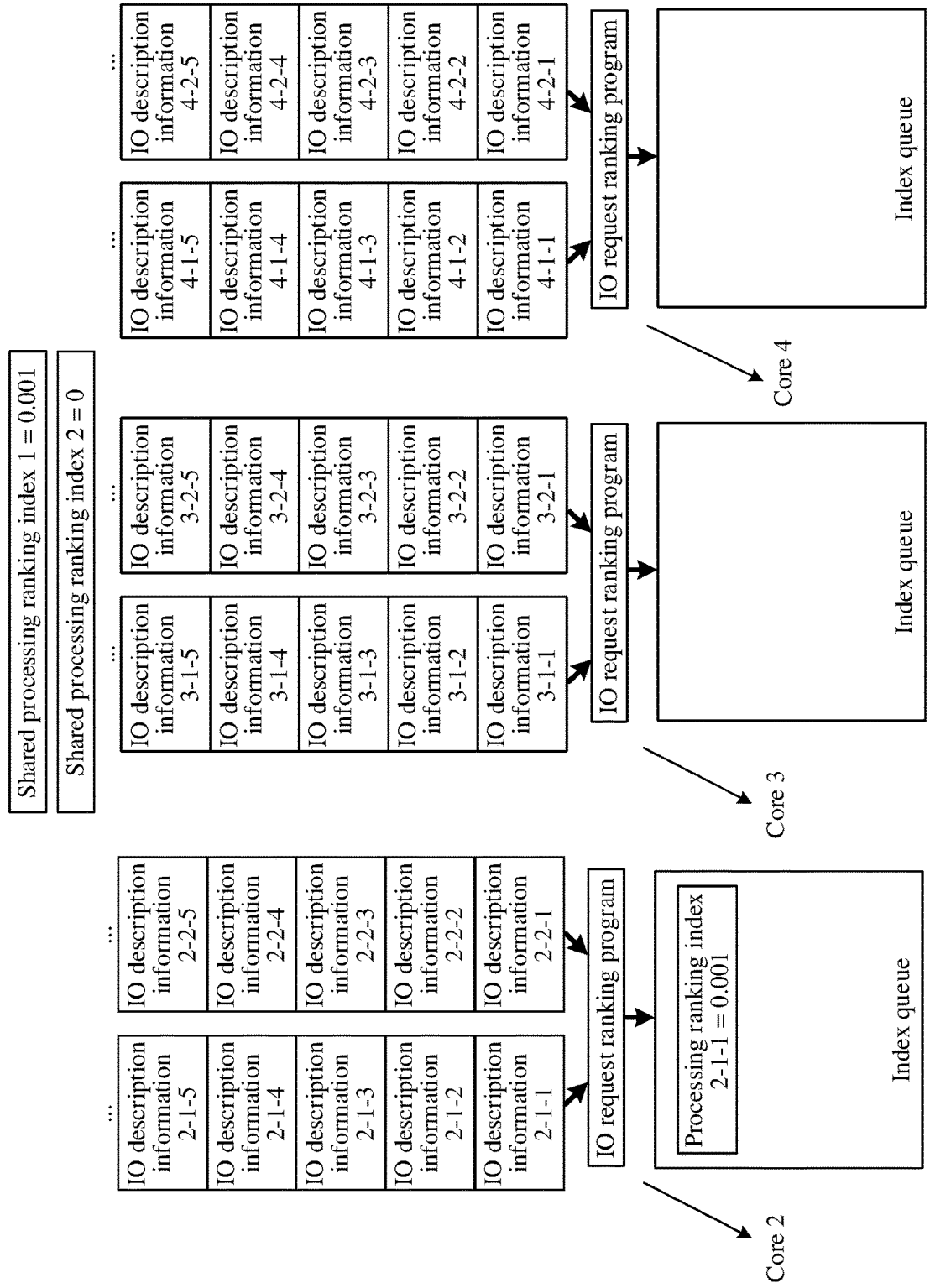

At a moment T1, an IO request ranking program running on a core 2 calculates a processing ranking index for IO description information 2-1-1, and the processing ranking index of the IO description information 2-1-1 is 0.001. Subsequently, the value of the shared processing ranking index 1 is updated to 0.001, as shown in FIG. 7B.

Figure 7C:
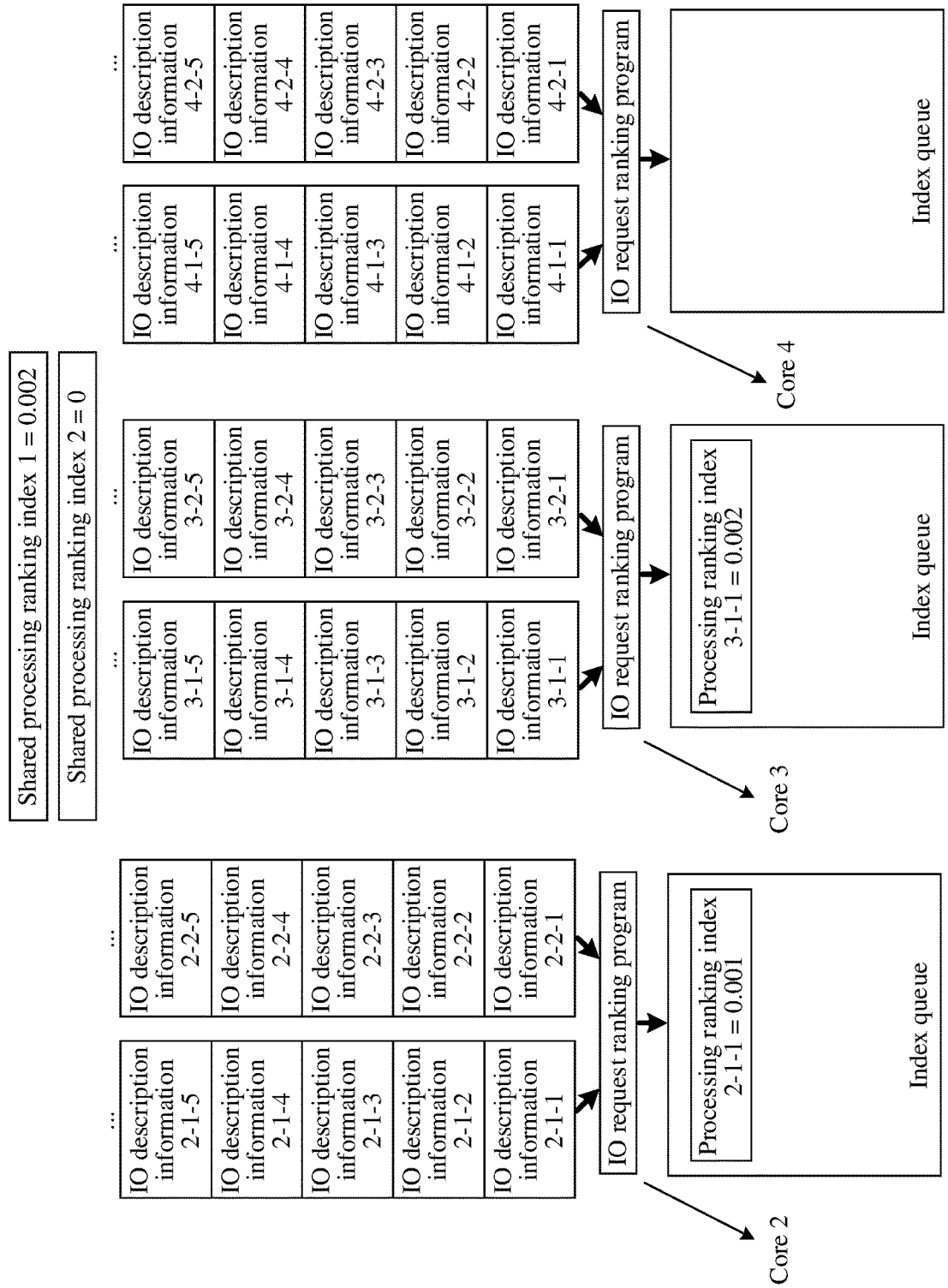

At a moment T2, an IO request ranking program running on a core 3 calculates a processing ranking index for IO description information 3-1-1, where the processing ranking index is 0.002. Subsequently, the value of the shared processing ranking index 1 is updated to 0.002, as shown in FIG. 7C.

At a moment T3, an IO request ranking program running on a core 4 calculates a processing ranking index for IO description information 4-1-1, where the processing ranking index is 0.003. Subsequently, the value of the shared processing ranking index 1 is updated to 0.003.

Figure 7D:
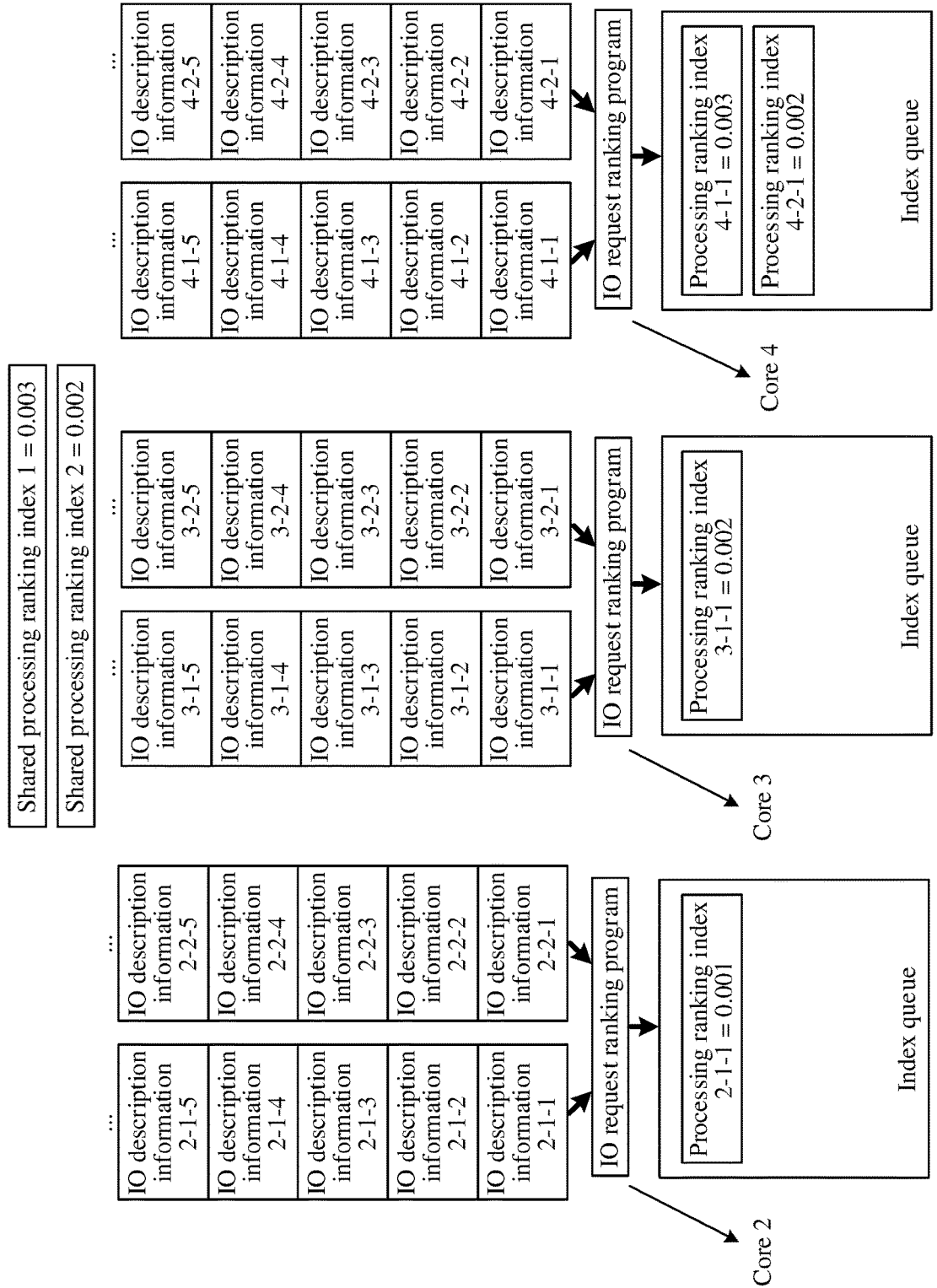

At a moment T4, the IO request ranking program running on the core 4 calculates a processing ranking index for IO description information 4-2-1, and the processing ranking index of the IO description information 4-2-1 is 0.002. Subsequently, the value of the shared processing ranking index 2 is updated to 0.002, as shown in FIG. 7D.

At a moment T5, the IO request ranking program running on the core 2 calculates a processing ranking index for IO description information 2-1-2, where the processing ranking index is 0.004. Subsequently, the value of the shared processing ranking index 1 is updated to 0.004.

Figure 7E:
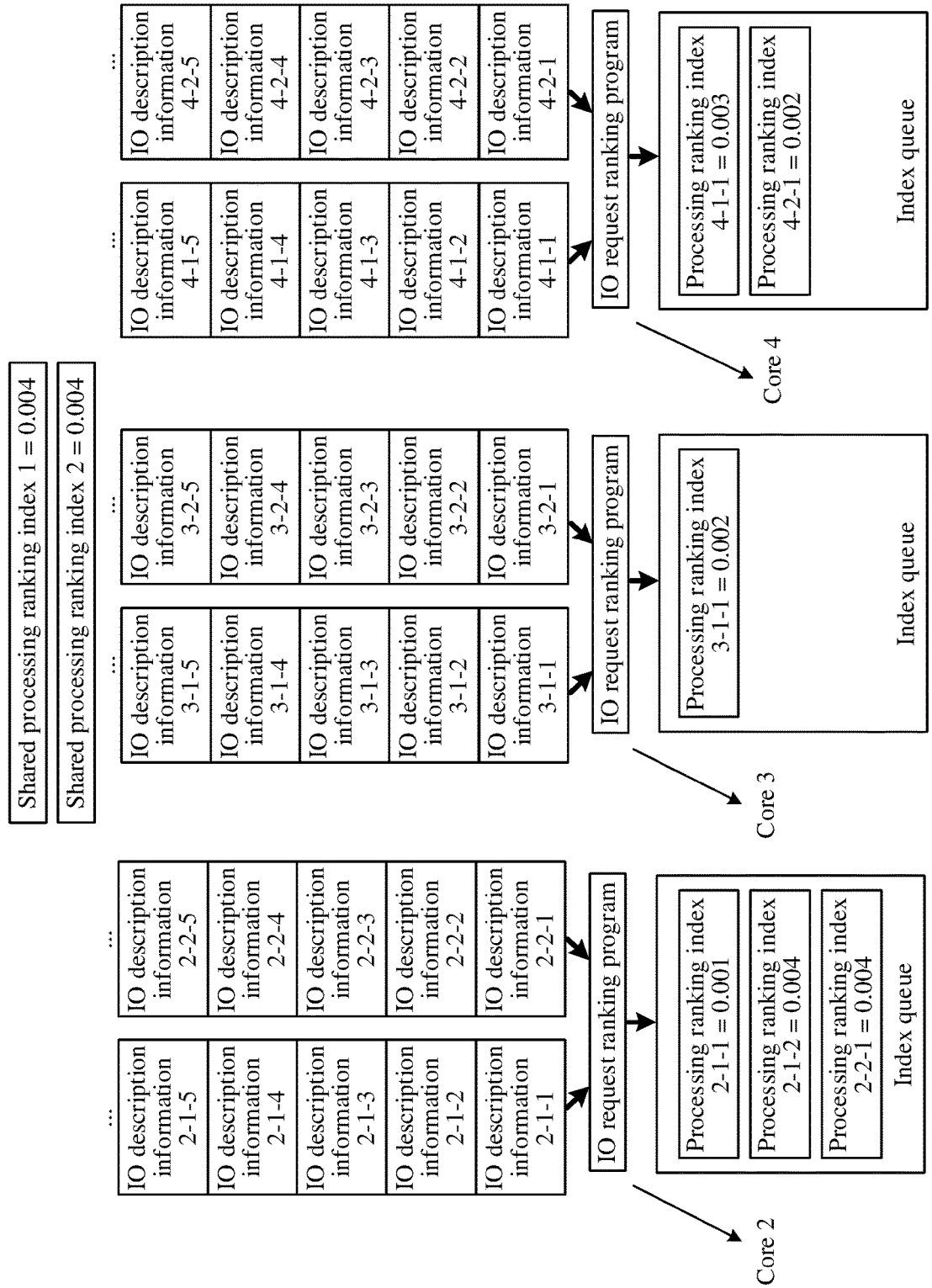

At a moment T6, the IO request ranking program running on the core 2 calculates a processing ranking index for IO description information 2-2-1, and the processing ranking index of the IO description information 2-2-1 is 0.004. Subsequently, the value of the shared processing ranking index 2 is updated to 0.004, as shown in FIG. 7E.

Processes of subsequently generating a processing ranking index in the core 2, the core 3, and the core 4 are performed by analogy.

In the examples corresponding to FIG. 7A to FIG. 7E, impact of a system time on a generation process of a processing ranking index is not considered.

As shown in FIG. 2, the storage controller applied to this application includes a bus, a processor, a memory device, and a communications interface. The processor, the memory device, and the communications interface communicate with each other using the bus.

The memory device may include a volatile memory, such as a random access memory (RAM).

The communications interface includes a network interface and a storage medium access interface, respectively configured to obtain an IO request sent by a client and access a storage medium.

The memory device stores code required for executing an IO request distribution program, an IO request ranking program, an IO request processing program, and an operating system. During operation of the storage controller, each core in the processor invokes code stored in the memory device, to perform the IO request processing method provided above.

In the foregoing embodiments, the descriptions of the embodiments have respective focuses. For a part that is not described in detail in an embodiment, refer to related descriptions in other embodiments.

The methods described with reference to the content disclosed in this application may be implemented in a manner of executing a software instruction by a processor. The software instruction may include a corresponding software module. The software module may be stored in a RAM, a flash memory, a read-only memory (ROM), an erasable programmable read-only memory (EPROM), an electrically erasable programmable read-only memory (EEPROM), a hard disk, a compact disc, or a storage medium in any other forms well-known in the art.

A person of skill in the art should be aware that in one or more of the foregoing examples, the functions described in this application may be implemented using hardware or software. When this application is implemented by software, these functions may be stored in a computer-readable medium or transmitted as one or more instructions or code in the computer-readable medium. The storage medium may be any available medium accessible to a general or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made based on the technical solutions of this application shall fall within the protection scope of this application.

What is claimed is:

1. A storage controller applicable to a storage system having a plurality of storage units, and comprising:
   a memory device configured to store a plurality of input/output (IO) requests and a shared processing ranking index for each storage unit of the plurality of storage units, wherein each IO request of the plurality of IO requests points to one storage unit of the plurality of storage units;
   a plurality of ranking cores coupled to the memory device;
   a distribution core coupled to the memory device and configured to:
      receive an IO request of the plurality of IO requests; and
      distribute the IO request to one of the plurality of ranking cores,
   wherein the one of the plurality of ranking cores is configured to:
      determine a target storage unit of the plurality of storage units to which the IO request points;
      obtain an IO per second parameter of the target storage unit;
      generate the processing ranking index for the IO request based on the IO per second parameter of the target storage unit and the shared processing ranking index corresponding to the target storage unit;
      update the shared processing ranking index corresponding to the target storage unit using the processing ranking index of the IO request;
      maintain an index queue corresponding to the one of the plurality of ranking cores comprising a plurality of processing ranking indexes generated by the one of the plurality of ranking cores for a subset of the plurality of IO requests distributed to the one of the plurality of ranking cores, wherein each of the plurality of ranking cores maintains a different index queue; and
      store the processing ranking index of the IO request in the index queue corresponding to the one of the plurality of ranking cores; and
   a request processing core coupled to the memory device and configured to periodically process an IO request corresponding to a smallest processing ranking index in the index queue corresponding to the one of the plurality of ranking cores.

2. The storage controller according to claim 1, wherein the one of the plurality of ranking cores is further configured to calculate, the processing ranking index of the IO request based on a sum of the shared processing ranking index corresponding to the target storage unit and a ratio of K to the IO per second parameter of the target storage unit, wherein K is a positive number.

3. The storage controller according to claim 2, wherein before calculating the processing ranking index of the IO request, the one of the plurality of ranking cores is further configured to:
   obtain a current system time; and
   use a larger one of the current system time and the sum of the shared processing ranking index corresponding to the target storage unit and the ratio of K to the IO per second parameter of the target storage unit as the processing ranking index of the IO request.

4. The storage controller according to claim 2, wherein the one of the plurality of ranking cores is further configured to:
   determine that an IO request that has been distributed to the one of the plurality of ranking cores, points to the target storage unit, and for which an index has not been generated does not exist at a time after the processing ranking index is generated for the IO request;
   calculate, at the time, a pending processing ranking index as a sum of the shared processing ranking index corresponding to the target storage unit and the ratio of K to the IO per second parameter of the target storage unit; and
   store the pending processing ranking index in the index queue.

5. The storage controller according to claim 4, wherein, within a duration in which the pending processing ranking index exists in the index queue, an IO request corresponding to a processing ranking index that is greater than the pending processing ranking index and that is comprised in the index queue cannot be processed by the request processing core, and wherein the one of the plurality of ranking cores is further configured to remove the pending processing ranking index from the index queue in response to the IO request pointing to the target storage unit being distributed to each of the plurality of ranking cores after the time.

6. The storage controller according to claim 4, wherein, within a duration in which the pending processing ranking index exists in the index queue, an IO request corresponding to a processing ranking index that is greater than the pending processing ranking index and that is comprised in the index queue cannot be processed by the request processing core, and wherein the one of the plurality of ranking cores is further configured to remove the pending processing ranking index from the index queue in response to the IO request pointing to the target storage unit being distributed to each of the plurality of ranking cores in response to the duration in which the pending processing ranking index exists in the index queue exceeding a preset threshold.

7. The storage controller according to claim 1, wherein the request processing core is further configured to:
   periodically access the index queue; and
   process a different IO request corresponding to the smallest processing ranking index in the index queue during each access.

8. An input/output (IO) request processing method performed by a storage controller of a storage system comprising a plurality of storage units, comprising:
   storing, by a memory device of the storage controller, a plurality of I/O requests and a shared processing ranking index for each storage unit of the plurality of storage units, wherein each IO request of the plurality of IO requests point to one storage unit of a plurality of storage units;
   receiving, by a distribution core of the storage controller, an IO request of the plurality of IO requests;
   distributing, by the distribution core, the IO request to a plurality of ranking cores of the storage controller;
   determining, by one of the plurality of ranking cores, a target storage unit of the plurality of storage units corresponding to the IO request;
   obtaining, by the one of the plurality of ranking cores, an IO per second parameter of the target storage unit;
   generating, by the one of the plurality of ranking cores, the processing ranking index for the IO request based on the IO per second parameter of the target storage unit and a value of a shared processing ranking index corresponding to the target storage unit;
   updating, by the one of the plurality of ranking cores, the shared processing ranking index corresponding to the target storage unit using the processing ranking index of the IO request;

maintaining, by the one of the plurality of ranking cores, an index queue corresponding to the one of the plurality of ranking cores comprising a plurality of processing ranking indexes generated by the one of the plurality of ranking cores for a subset of the plurality of IO requests distributed to the one of the plurality of ranking cores, wherein each of the plurality of ranking cores maintains a different index queue;

storing, by the one of the plurality of ranking cores, the processing ranking index of the IO request in the index queue corresponding to the one of the plurality of ranking cores; and periodically processing, by a request processing core, an IO request corresponding to a smallest processing ranking index in the index queue corresponding to the one of the plurality of ranking cores.

9. The method according to claim 8, wherein the generating, by the one of the plurality of ranking cores, the processing ranking index for the IO request comprises calculating the processing ranking index of the IO request based on a sum of the shared processing ranking index corresponding to the target storage unit and a ratio of K to the IO per second parameter of the target storage unit, wherein K is a positive number.

10. The method according to claim 9, wherein before the calculating, by the one of the plurality of ranking cores, the processing ranking index of the IO request, the method further comprises:

obtaining, by the one of the plurality of ranking cores, a current system time; and using, by the one of the plurality of ranking cores, a larger one of the current system time and the sum of the shared processing ranking index corresponding to the target storage unit and the ratio of K to the IO per second parameter of the target storage unit as the processing ranking index of the IO request.

11. The method according to claim 9, wherein the method further comprises:

determining, by the one of the plurality of ranking cores, that an IO request that has been distributed to said each ranking core, points to the target storage unit, and for which an index has not been generated does not exist at a time after which the processing ranking index is generated for the IO request;

calculating, at the time by the one of the plurality of ranking cores, a pending processing ranking index as a sum of the shared processing ranking index corresponding to the target storage unit and the ratio of K to the IO per second parameter of the target storage unit; and storing, by the one of the plurality of ranking cores, the pending processing ranking index in the index queue.

12. The method according to claim 11, wherein, within a duration in which the pending processing ranking index exists in the index queue, an IO request corresponding to a processing ranking index that is greater than the pending processing ranking index and that is comprised in the index queue cannot be processed by the request processing core, and wherein the method further comprises removing the pending processing ranking index from the index queue in response to the IO request pointing to the target storage unit being distributed to each of the plurality of ranking cores after the time.

13. The method according to claim 11, wherein, within a duration in which the pending processing ranking index exists in the index queue, an IO request corresponding to a processing ranking index that is greater than the pending processing ranking index and that is comprised in the index queue cannot be processed by the request processing core and wherein the method further comprises removing the pending processing ranking index from the index queue in response to the IO request pointing to the target storage unit being distributed to each of the plurality of ranking cores in response to the duration in which the pending processing ranking index exists in the index queue exceeding a preset threshold.

14. The method according to claim 8, wherein periodically processing, by the request processing core, the IO request corresponding to the smallest processing ranking index in the index queue comprises:

periodically accessing the index queue corresponding to said each ranking core; and processing a different IO request corresponding to the smallest processing ranking index in the index queue during each access.

15. A non-transitory computer readable storage medium storing instructions, which, when executed by a storage controller, causes the storage controller to be configured to:

store, by a memory device of the storage controller, a plurality of input/output (IO) requests and a shared processing ranking index, wherein each IO request of the plurality of IO requests point to one storage unit of a plurality of storage units, and wherein the shared processing ranking index is associated with each storage unit of a plurality of storage units in a storage system controlled by the storage controller;

receive, by a distribution core of the storage controller, an IO request;

distribute, by the distribution core, the IO request to a plurality of ranking cores of the storage controller;

determine, by one of the plurality of ranking cores, a target storage unit of the plurality of storage units corresponding to the IO request;

generate, by the one of the plurality of ranking cores, the processing ranking index for the IO request;

update, by the one of the plurality of ranking cores, the shared processing ranking index corresponding to the target storage unit using the processing ranking index of the IO request;

maintain, by the one of the plurality of ranking cores, an index queue corresponding to the one of the plurality of ranking cores comprising a plurality of processing ranking indexes generated by the one of the plurality of ranking cores for a subset of the plurality of IO requests distributed to the one of the plurality of ranking cores, wherein each of the plurality of ranking cores maintains a different index queue;

store, by the one of the plurality of ranking cores, the processing ranking index of the IO request in the index queue corresponding to the one of the plurality of ranking cores; and periodically process, by each request processing core of the storage controller, an IO request corresponding to a smallest processing ranking index in the index queue.

16. The non-transitory computer readable storage medium according to claim 15, wherein the instructions further cause the storage controller to be configured to calculate the processing ranking index of the IO request based on a sum of the shared processing ranking index corresponding to the target storage unit and a ratio of K to the IO per second parameter of the target storage unit.

17. The non-transitory computer readable storage medium according to claim 15, wherein the instructions further cause the storage controller to be configured to use a larger one of a current system time and the sum of the shared processing ranking index corresponding to the target storage unit and the ratio of K to the IO per second parameter of the target storage unit as the processing ranking index of the IO request.

18. The non-transitory computer readable storage medium according to claim 15, wherein the instructions further cause the storage controller to be configured to calculate a pending processing ranking index as a sum of the shared processing ranking index corresponding to the target storage unit and the ratio of K to the IO per second parameter of the target storage unit.

19. The non-transitory computer readable storage medium according to claim 15, wherein each of the plurality of ranking cores is associated with a different index queue comprising the processing ranking indexes after sorting is performed on the processing ranking indexes.

20. The non-transitory computer readable storage medium according to claim 15, wherein the index queue further comprises the processing ranking indexes for the IO requests sorted by the one of the plurality of ranking cores.

\* \* \* \* \*